Aug. 30, 1966       N. COHN       3,270,209
ECONOMIC LOADING OF POWER SYSTEMS
Filed Dec. 17, 1962       4 Sheets-Sheet 1

N. COHN 3,270,209

ECONOMIC LOADING OF POWER SYSTEMS

Filed Dec. 17, 1962

3,270,209
ECONOMIC LOADING OF POWER SYSTEMS
Nathan Cohn, Jenkintown, Pa., assignor to Leeds and Northrup Company, Philadelphia, Pa., a corporation of Pennsylvania
Filed Dec. 17, 1962, Ser. No. 244,973
17 Claims. (Cl. 307—57)

This invention relates to methods of and systems for the economic loading of interconnected generating stations forming an electrical power area and has for an object the provision of a simplified but reliable arrangement by means of which the generation of the respective power sources of the area may be brought to values which for all values of area load yield minimum cost of operation of the area as a whole.

For convenience, the term "area" as used hereinafter will identify that part of an interconnected system which is to absorb its own load changes. Thus it may embrace an interconnected system in which that system as a whole absorbs the load changes which may occur on any part of the system. When there are two interconnected areas, the tie line or tie lines between them will be metered to provide a measurement of tie line load for comparison with scheduled tie line loads between such areas.

Those skilled in the art have utilized the coordination equations which coordinate incremental transmission losses and incremental fuel costs for the computation and establishment of lambda which is the incremental cost of delivered power. It is also known that most economical operation of a power area is achieved when the lambdas for all sources are equal. In a control system of the type disclosed by Miller Patent 2,836,731 there is provided a desired generation computer which makes an exact computation of the area lambda, that is at all times representative of the area lambda required for the area generation to match the existing area load and interchange schedules with other areas. This computation is independent of the control feedback loop through the area network itself to the area requirement computation and hence is independent of the rate at which area generation can be changed. Another method known to those skilled in the art is to adjust area lambda continuously in response to area requirement until the resulting change in area generation reflected through the area power network restores the area requirement to zero. When this is achieved, and the individual sources are loaded to the levels required by the prevailing value of the adjusted area lambda, the area is operating to achieve maximum economy. It will be noted that this method of establishing area lambda is dependent on feedback through the area power network to the area requirement computation, and hence is dependent on the rate at which area generation is changed.

A feature of the control systems of the Miller patent, mentioned above, is that there is provided a signal at all times representative of total area generation required of the sources to maintain the scheduled operatiing condition of the area. In the other method, mentioned above, there is lacking any determination of the total generation required of the generating sources.

In accordance with the present invention, there is provided a system much simpler than that of the Miller patent and yet one which retains some of its desirable features including the utilization of the total generation required from the source to meet the load and interchange requirements of the area. Also the system provided by the present invention in one form thereof represents an improvement over the other method earlier discussed, in that dependence on feedback through the area power network to the area requirement computation is minimized. More particularly, there is first developed a first effect representative of the total generation required of the group of sources to maintain an area schedule. By then applying this effect to apparatus which interrelates two effects one representative of the total generation of the group and the second representing a corresponding incremental cost for the group there is produced an output varying as the incremental cost required of the group for the most economic operation thereof. The incremental cost thus computed may not be precisely the one required, depending upon how closely the relationship between total generation and lambda has previously been anticipated and set. Where the lambda output thus obtained is not precisely the one required, it is modified in accordance with the required change in group generation to maintain the schedule, which is to say in accordance with area requirement. If the lambda or incremental cost of the group at the level of total generation required thereof should not be precisely accurate an area requirement other than zero would persist. The change in the lambda output by action of area requirement will be in the direction toward the precise value of lambda required to maintain the area requirement at zero while loading area sources to equal lambda. On the other hand if the determination be accurate and there exists an area requirement, the apparatus may provide a temporary change in an output signal representative of lambda beyond the newly required value of lambda in order to vary the generation of the area in the correct direction and more quickly to meet the requirements of total generation. This temporary change or area assist action may be introduced by variation of the control signal.

In carrying out the invention in one form thereof there is provided at the dispatcher's office, or at the point where the lambda computation is to be made, a measurement of area requirement. The term "area requirement," though understood by those skilled in the art, may be defined as a measure, in megawatts, of the prevailing area generation error. It is the amount by which the generation of the area is off area schedule, which schedule may be frequency-biased tie line load, flat tie line load, flat frequency, or include other factors such as time error or area acceleration. It is the amount by which area generation must be changed by supplementary area regulation in order that the area shall correct its net interchange and also to do its share of system frequency regulation where the area schedule is based on frequency-biased tie line load. In the following description the area requirement will be referred to as the amount by which the area is off a frequency-biased tie line load schedule.

When there is available at the dispatcher's office a signal represenattive of the total existing area generation, by taking the algebraic sum of the area requirement signal and of the total existing area generation signal there is obtained a signal representative of the total generation required of the area to carry its own load, to fulfill its inter-area interchange schedules and also to do its share of system frequency regulation. Having obtained the total generation required of the area, it now becomes possible to use this information to compute a system lambda which with all of the sources operating at this value of lambda will provide the total generation required of the area and with most economic operation. In accordance with the present invention, the value of lambda derived from the total generation required may be approximate. Since lambda is approximated, provision has been made as indicated above to vary the control action to assure ultimate operation at the lambda for the area necessary to produce a total area generation to meet the total generation required.

In some areas where transmission losses are of a low order, control system have been utilized which do not include in their computation the effect of such transmission losses. Mathematically, when the differences in incremental transmission losses for area sources are so small that they may be ignored, the lambda of each source then corresponds with its incremental cost of generation. Subsequent references in the following description to lambda or incremental cost infers incremental cost of power delivered where consideration of transmission loss effects are included in the control system, and to incremental cost of power generated where such consideration of transmission loss effects is not introduced.

In the detailed description to follow and in which the invention will be described in conjunction with several different executions thereof, and in which further objects and advantages will be set forth, reference is to be had to the accompanying drawings in which.

Figure 1:
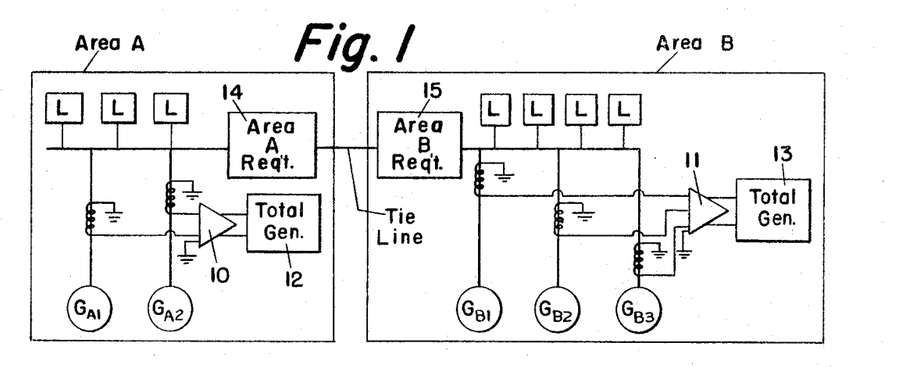
FIG. 1 schematically illustrates two interconnected power areas labeled area A and area B, each having generators supplying their own respective areas and also connected to a tie line between the area.

Referring now to FIG. 1, there has been illustrated within the two rectangles labeled "Area A" and "Area B" the two parts or areas of an interconnected system, each area of which is to absorb its own load changes. For examples, in area A the two sources of generation illustrated as generators $G_{A1}$ and $G_{A2}$ are connected to a distribution network having its own local loads represented by the small rectangles labeled L. Area A is connected to area B by a tie line. In area B there are also local loads L and generation sources $G_{B1}$, $G_{B2}$ and $G_{B3}$. For area A, the area A requirement is computed by a computing network indicated by the rectangle 14. This system may be of the type disclosed in my Patent 2,773,994, FIG. 9. A similar network in rectangle 15 is utilized for area B to compute area B requirement.

Figure 2:
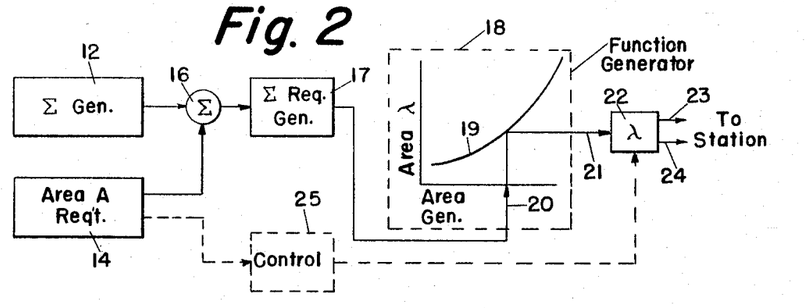
FIG. 2 diagrammatically illustrates the invention in one form thereof.

In conventional manner the generation from each source is measured and through summing amplifiers 10 and 11 provide measurements as at rectangles 12 and 13 of the total generation of area A and of the total generation of area B respectively. In order to provide economic loading of area A, there is provided as shown in FIG. 2 at the load dispatcher's office or at any other selected point where the computations are to be made the computing network 14 for computation of area requirement for area A and also the indication as at rectangle 12 of the total actual generation of area A. Tie line measurements as required for the area requirement computation, and source generations as required for the total generation computation, are telemetered to the location where these computations are to be made. The outputs from the devices or networks 12 and 14 are applied to a summing device 16 which may be a summing amplifier and the output will then be representative of the total required generation of area A for area A to maintain its schedule. The output from the summing device 16 is applied to a recorder 17 which may indicate and record the total required generation. The output from the summing device 16, being representative of total required generation for area A, may be applied directly or by way of recorder 17 to a function generator 18 which is symbolically illustrated in FIG. 2.

The function generator itself may be of the kind disclosed in Patent 3,059,853 to Davis III and dated October 23, 1962, or it may be a Perkin-Elmer Series 12 Adjustable Function Generator. As illustrated in FIG. 2 of said Davis patent, the function generator 18 approximately interrelates two effects, one area generation plotted along the abscissa and area lambda as ordinates. This interrelationship is shown by the graph 19. It is to be understood that the area generation plotted on the abscissa of the function generator is that generation which is obtained when all sources of the area that are under control are operating at the lambda plotted on the ordinate. In other words this is the relationship which provides optimum area economy. The function generator 18 operates in response to the signals from the summing means 16 representative of the required generation for area A. Thus a signal applied to the function generator at a point of the abscissa corresponding with the foregoing requirements of generation has a corresponding value for lambda. The arrow 20 is located at a point on the abscissa which may be considered graphically to correspond with the required generation. The function generator then produces an output as indicated by the arrow 21 the magnitude of which is determined by the graph 19. That output is representative of the value of lambda for area A for the foregoing value of area generation. It is in this manner that there is produced a signal representative of area lambda for area A.

If the graph or curve 19 interrelating area generation and area lambda were precise, signals representative of area lambda could be transformed into corresponding signals precisely representative of the required generation for each station or unit. Hence the extent of change in generation for each source would be known and would be made immediately and preferably automatically to restore area requirement to zero, while loading the sources for equal incremental cost and hence for optimum economy. The difficulty, however, is that the curve 19 may be and generally is an approximation of the relation between area generation and area lambda.

In accordance with the present invention signals developed by or representative of the area requirement of area A are applied from computing network 14 to a control means 25 which serves to vary the magnitude of the signals at box 22 representative of system lambda. The modification of the system lambda signal is in direction dependent upon the required change in group generation for area A to maintain its schedule. This corrective or modifying action applied to area lambda at box 22 will persist until the area requirement signal is reduced to zero. Inasmuch as the purpose of this modifying signal is to vary the output from the area lambda block 22, it will be understood, of course, that the modifying signal might be applied to the input to function generator 18 indicated by the arrow 20 effectively to vary its position along the abscissa and hence to produce a modified lambda signal. Alternatively, a parameter of the function generator 18 may be varied or the output 21 may be varied. It is here emphasized that the system of FIG. 2 takes advantage of the fact that an approximate lambda is instantaneously achieved from the function generating means 18 on the basis of the combination of area requirement and total existing area generation. Thus, when a load change occurs in area A, it is reflected promptly in the area A requirement, block 14. A new area lambda value is promptly established through block 18. This area lambda, block 22, provides output signals which, through telemetering links 23 and 24, cause generation changes at the controlled sources. As these new generation levels appear in the total generation signal, block 12, there is a corresponding decrease in the area requirement signal of block 14. For a prevailing area load, the summation of the area requirement and total generation signals is substantially constant, yielding a constant total required generation at block 17. Thus, for a given load condition in area A, the input to block 18 remains constant and the output for block 18, area lambda, is constant, and remains constant independent of the rate at which the previously mentioned load change has been accommodated by generation changes at the controlled sources. In brief, the area requirement signals of block 14 are representative of feed-forward control signals, while the total area generation signals at block 12 are representative of feedback control signals and the sum of these feed-forward and feedback signals, for a given area load condition, is substantially constant. By so utilizing a combination of the two signals, the extent of lambda adjustment required from the supplementary control including the control block 25 is minimized and is needed only to compensate for any lack of precision in the establishment of curve 19.

Figure 3:
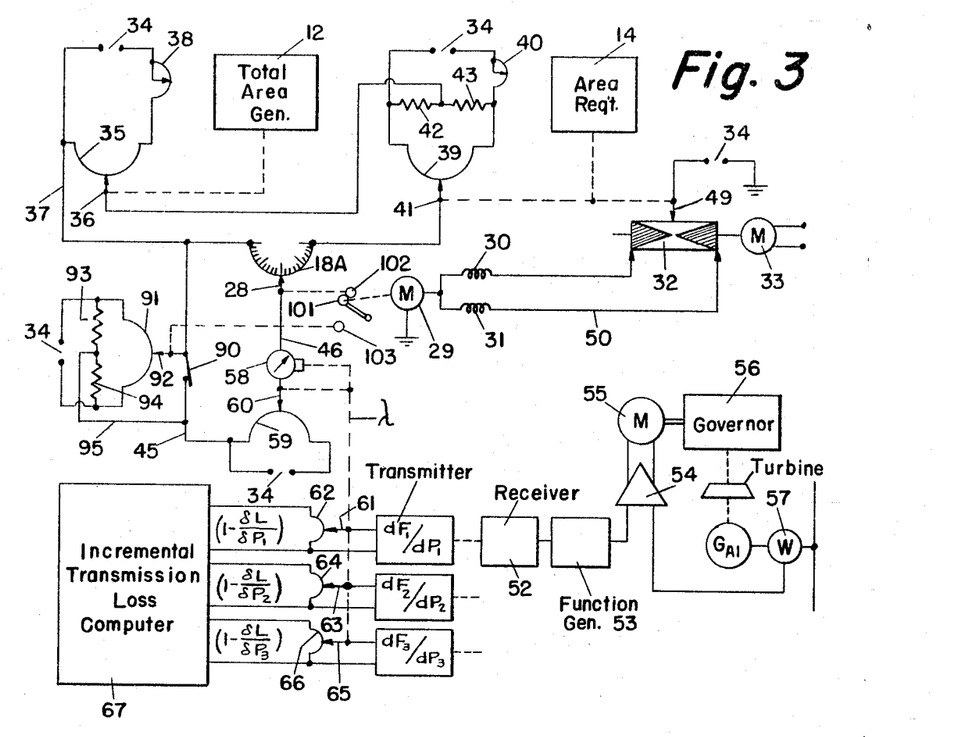
FIG. 3 diagrammatically illustrates the invention in another form thereof.

Referring now to FIG. 3, the function generator 18A has been shown as a variable resistor in the form of a slidewire having a movable contact 28 operable under the control of a motor 29 having forward and reverse windings 30 and 31 energized under the control of a pulse generator 32 driven by a motor 33. The pulse generator 32 is connected to a suitable source of supply 34. The function generator 18A is included in circuit with a total system generation slidewire 35 the movable contact 36 of which is adjusted by the total system generation box 12. The slidewire 35 or potentiometer is energized from a suitable source of supply 34. For any given position of contact 36, the magnitude of the output voltage between the slider contact 36 and a conductor 37 may be adjusted by a series rheostat 38. An area requirement slidewire or potentiometer 39 is energized from a suitable source 34 in series with a rheostat 40. The slider or sliding contact 41 of potentiometer 39 is connected in series circuit relation with slidewire 18A. The series circuit then extends by way of conductor 37 through the left-hand portion of potentiometer 35. From contact 36 it extends to the midpoint of resistors 42 and 43. In general resistors 42 and 43 will be of equal value so that the contact 41 will be at the center of slidewire 39 when the area requirement is zero. Accordingly this series circuit algebraically adds the output from the potentiometer 39 representing area requirement to the output from potentiometer 35 representing total area generation, the algebraic sum then being the total required generation for area A to meet its scheduled operating condition. Thus, the described circuit performs the function of the summing means 16, FIG. 2.

In order for the sum of the area requirement voltage from potentiometer 39 and the total system generation voltage from potentiometer 35 to be equal to the total required system generation, the rheostats 40 and 38 must be adjusted to provide for their respective slidewires equal voltage gradients of voltage versus megawatts. Where an area assist control action is desired, area assist being fully discussed in my Patent 2,866,102, then the rheostat 40 may be adjusted to increase the current flowing through the potentiometer 39, and to increase its voltage gradient. By increasing the voltage from the area requirement potentiometer 39, there will be provided an area assist action. This means that the output from the summing means or summing circuit will be an effect which not only varies with total system required generation but will also have an additional component that is proportional to area requirement. This latter component will through the control system provide for a more rapid return of the area to its schedule and will be zero when the area is on schedule.

Figure 4:
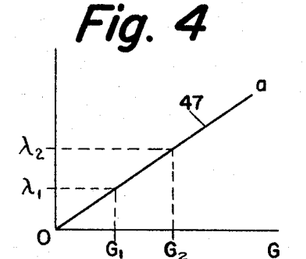
FIGS. 4 and 5 and 5A are graphs illustrative of the operation of the system of FIG. 3.

The output of the function generator 18A, as between conductors 45 and 46, is lambda for area A. Accordingly for operation of the apparatus with switch 90 closed and with the input to function generator 18A representative of the total required generation and the output representing area lambda, the relation between these two quantities may be illustrated as shown in FIG. 4 by the graph 47. It will be observed that the graph 47 is a straight line with its origin passing through zero. Though ordinarily a straight line does not accurately express area lambda in terms of total area generation, the graph 47 may be taken as the approximation previously discussed. When the output between conductors 45 and 46 representing area lambda as read from the graph 47 for a given input representing total required generation for area A does not provide sufficient area generation for the area to meet its schedule, there will be modification of the output signal by the modifying means including the pulse generator 32. It will be seen that as an area requirement signal is developed by the area requirement box 14, not only is the contact or slider 41 adjusted relative to potentiometer 39 but also the movable contact 49 of the pulse generator 32 is moved to the right or to the left depending upon whether or not the area requirement signal indicates generation should be increased or decreased. Thus if the generation is to be increased it may be assumed that the contact 49 will be moved to the right to apply pulses from the source 34 through the shaded conducting segments of pulse generator 32 by way of conductor 50 to the motor winding 31 and thence through the armature of the motor 29 to ground. The motor 29 will then be energized in the direction to move through gears 101 and 102 the contact 28 to the right to change the input-output relation of the function generator thus to increase the voltage output. It will be seen at once that the effect of this change in position of contact 28 is to rotate the graph 47 in a counterclockwise direction about the origin. Thus for any given input to the potentiometer 18A the modifying system, for the operation described, will produce an increased output. Conversely, if the contact 49 be moved to the left from its midposition by the area requirement box 14, the output from potentiometer 18A will be decreased by moving contact 28 to the left. This change will correspond with the rotation of graph 47 in a clockwise direction about the origin i.e. the intersection of the two coordinates.

In a typical area the relation between area generation and area lambda generally may not be accurately represented by a straight-line graph. However, because of the ability of the apparatus described to automatically vary the slope of the graph 47 of FIG. 4, it is nevertheless possible for the apparatus of FIG. 3 to be used with power areas in which the plot of total area generation versus area lambda is curvilinear.

Figure 5:
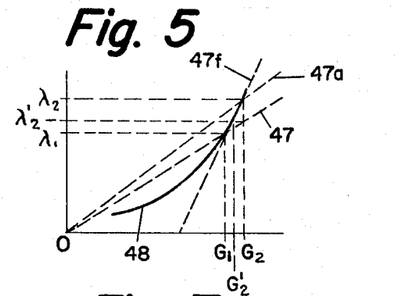

The foregoing can be readily understood by reference to FIG. 5 where the solid line graph 48 is non-linear and may be taken as the actual relationship between the total area generation and area lambda. The straight line graph 47 of FIG. 5 corresponds with the similarly numbered graph 47 of FIG. 4. It will be assumed that the total area generation is at the level $G_1$ of FIG. 5. According to the graph 47, the area lambda will then have the value of $\lambda_1$. If the area requirement now increases by an amount equal to the generation $G_2$ minus the generation $G_1$, the above described circuit of FIG. 3 including the potentiometers 39 and 18A will produce an instantaneous recomputation of lambda. This computation will provide an output between conductors 45 and 46 representative of the value of $\lambda'_2$.

Because of the curvilinear relation between area lambda and total area generation, this value of $\lambda'_2$ when applied to the control of area generation will only increase the generation to $G'_2$. Because of the curvilinear relation between area lambda and total area generation, this change in area generation in response to the change in lambda is less than the change in area load, hence the area requirement will not be restored to zero. However, the increase in the area requirement also moves the contact 49 to the right to cause contact 28 to be moved to the right and thus increases the output developed between conductors 45 and 46. The movement of contact 28 will continue until the output developed between conductors 45 and 46 reaches a value representative of $\lambda_2$. When this is accomplished, the total area generation will be $G_2$ and the area requirement will have been reduced to zero. The movement of contact 28 is graphically illustrately in FIG. 5 by the counterclockwise rotation of straight line 47 about the origin until it passes through the point $\lambda_2$, $G_2$ as shown by straight line 47a.

If the transmission losses be ignored, or if they be so small as to be considered negligible in a given area, then the voltage appearing between output conductors 45 and 46, representative of area lambda, may also be taken as equal to the incremental cost of generation for each of the sources and generally designated as $dF/dP$. Thus the output signals from conductors 45 and 46, by conventional telemetering, may be sent to a receiver 52, one at each generating station. The receiver 52 applies a signal representative of $dF/pP$ to a function generator 53 which converts these signals representative of incremental cost of generation to signals representataive of desired generation for a particular source. These signals are applied in a conventional manner to a summing amplifier 54 which controls the direction of rotation of a governor adjusting motor 55 of a governor 56 of the prime mover, shown as the "Turbine," for driving generator $G_{A1}$ of area A (of FIG. 1). It will be observed that a wattmeter 57 is connected in the output circuit of generator $G_{A1}$ and it too applies to the summing amplifier 54 an input signal representative of the generation of generator $G_{A1}$. Thus the summing amplifier 54 has an output signal equal to the difference between the desired generation for $G_{A1}$ and its existing generation. The output of generator $G_{A1}$ is adjusted until its existing generation is equal to the desired generation.

As illustrated in FIG. 3, account is taken of transmission losses. To this end, the output conductors 45 and 46 and the output or left-hand section of potentiometer 18A are included in a balanceable circuit which also includes an unbalance detector 58 and a potentiometer slidewire 59 energized from a source of supply 34 and whose contact 60 is adjustable by the detector 58. Thus as a voltage appears across conductors 45 and 46, the contact 60 is moved in a direction to produce an equal and opposite voltage from slidewire 59. The mechanical output of the detector 58 has a position representative of area lambda and is utilized to adjust the contacts 61, 63, and 65 respectively associated with slidewires 62, 64, and 66. These slidewires 62, 64, and 66 are energized from a suitable incremental transmission loss computer 67 of the type which may be as shown and described in Early Patent 2,836,730 including those of the digital type. As fully explained in said Early patent, the computer 67 provides outputs respectively equal to unity minus the incremental transmission loss for the respective sources. These outputs are the signals applied respectively to the slidewires 62, 64, and 66. The outputs from these slidewires then represent quantities proportional to the $dF/dP$ values for the respective stations or generators. More specifically, the slidewires 62, 64, and 66 respectively perform multiplications of the quantity system lambda times the quantity unity minus the incremental transmission loss and the products of these multiplications are $dF/dP$ for the several sources. These respective $dF/dP$ quantities are then transmitted by suitable telemetering equipment to the appropriate telemetering receiver 52 for control of the generation of the sources as described above.

Again referring to the straight line curve 47a of FIG. 5 and assuming that the total generation of area A is equal to $G_2$, it will seem that as total required generation deviates from $G_2$ and in the absence of any modifying effect by the area requirement, the output in terms of lambda will be along the graph 47a. This indeed will represent a change in lambda significantly different from the change that would occur if the straight line curve 47a had the same slope as that section of curve 48 including the area generation value $G_2$.

This desirable objective, modifying the action more closely to follow graph 48 as by following the straight line 47f, may be readily realized by variations of the circuits of FIG. 3. Exemplary of such variations are the changes in FIG. 3 that may be achieved by operation of the electrical switch 90 alone or by that switch and by changing the position of driving gear 101 of the mechanical gear train including gears 101–103.

Assuming now that the switch 90 is operated to its open position, a potentiometer 91 will then be connected to introduce its output voltage in series with the output from the function generator 18A. This potentiometer 91 in the form of a slidewire having an adjustable contact 92 is connected to a source of supply 34 and it is provided with equal-valued resistors 93 and 94. A conductor 95 is connected to their midpoints and to the conductor 45. With the contact 92 in its midposition no change in operation of the system of FIG. 3 occurs since zero voltage is introduced into the output circuit. Thus the curves of graph FIG. 5 are applicable.

Figure 5A:
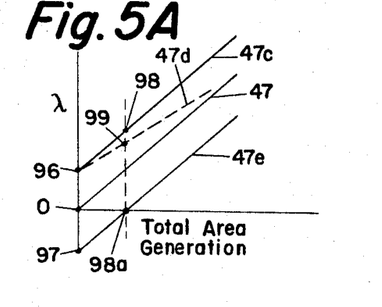

If the contact 92 be manually adjusted from its midposition, a voltage aiding or opposing the voltage from the function generator 18A may be introduced in series with conductor 45. If the voltage be aiding, the effect will be to introduce an offset in graph 47 so that, for example, it will pass through point 96, FIG. 5A instead of the origin. Operation will then be established along the graph 47c having its intercept at 96. If the voltage introduced from potentiometer 91 be in opposing relation, then the curve 47 will have a negative offset value and its intercept will then be at the point 97 though the only effective part of that curve of course will be to the right of the point 98a on the total area generation axis.

Returning now to the curve 47c, and assuming that the area requirement signal from block 14, FIG. 3, will have moved contact 49 of the pulse generator 32 to the left to adjust contact 28 to the left to reduce the voltage output, the effect is to reduce the voltage say from point 98 on curve 47c to the point 99. If the contact 28 now be assumed to be stationary, then the output voltage from the function generator 18A will have an output voltage linearly related to the input voltage. Accordingly curve 47d will express the change in lambda with the change in total area generation. It is in this manner that the slope of the characteristics curve 47c is changed to that of 47d and of course to other values depending upon the extent of adjustment of contact 28.

It will be apparent that when the magnitude of the total area generation is in the range of $G_1$ and $G_2$, FIG. 5, the straight line 47f provides a close approximation to the actual relation between area generation and area lambda as represented by graph 19. This straight line relation 47f can be obtained as above described by introducing in series with conductor 45, FIG. 3, a voltage from potentiometer 91 in opposition to the voltage from the function generator 18A and by appropriate adjustment of contact 28 from motor 29.

It can now be understood that if the driving gear 101 be moved from its position in driving engagement with gear 102 to engage drive gear 103, the contact 92 will be automatically adjusted in response to the pulse generator 32 and in accordance with the area requirement signals from block 14. The effect of this automatic adjustment will be to shift curve 47 parallel to itself and upwardly or downwardly depending upon the direction of offset voltage introduced by potentiometer 91. Accordingly by translational shifting of the characteristic curve 47 in response to the presence of area requirement signals, any error in the approximate area lambda will be corrected in generally the same manner as previously described but through an execution which differs therefrom.

In the previously described modifications the function generator has provided a succession of single straight line relationships between input and output. In order for these straight line relationships to approximate the true relations between area generation and area lambda, provisions are included for rotation, for translation, and for rotation and translation of the graph 47 relative to the coordinates of the graph.

Figure 6:
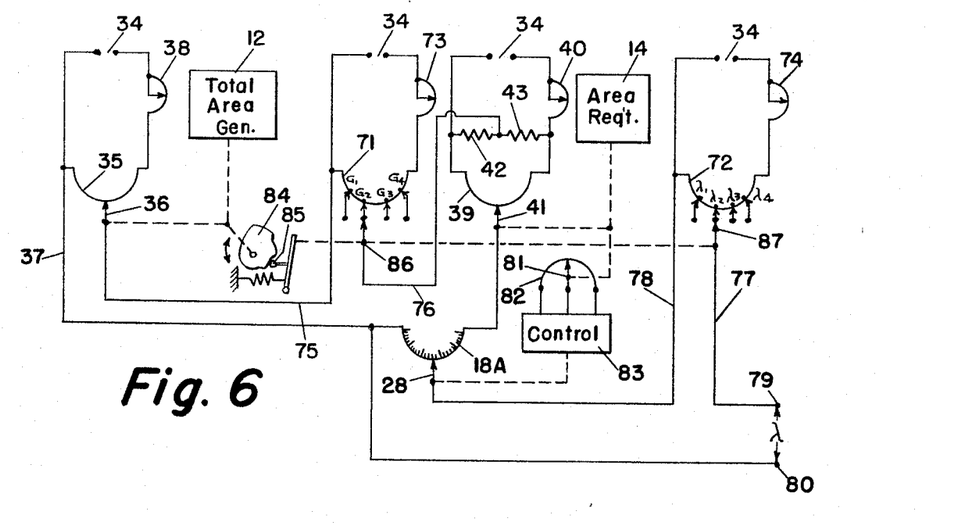
FIG. 6 diagrammatically illustrates a further modification of the invention.
Figure 7:
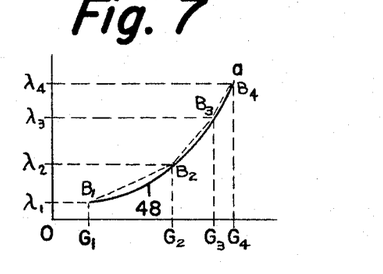
FIG. 7 is a graph illustrative of the operation of the system of FIG. 6.

FIG. 7 is illustrative of further modifications of the invention where the area-generation versus the area lambda graph is approximated not by a single straight line but by a plurality of straight line relations with automatic switching from one straight line portion to another as the total area generation changes. Thus, it will be seen that the true lambda curve 48 is approximated by a series of straight line segments the first extending between the points $B_1$ and $B_2$, the second between the points $B_2$ and $B_3$ and the third between the points $B_3$ and $B_4$. If it be assumed that the total required area generation has a value at $G_4$ and that generation decreases, the corresponding lambda values from the straight line $B_4$–$B_3$ will be a very close approximation to those which obtained from the true lambda graph 48. Thus an improvement is achieved over the arrangement graphically illustrated by FIG. 5. The manner in which the straight line segments are produced and the manner in which they interconnect the breakpoints $B_1$–$B_4$ will now be explained in terms of FIG. 6. For convenience, it is noted that those skilled in the art frequently refer to basepoints. Basepoints may be defined as the magnitude of area generation at the breakpoints or extremities of each segment of the straight lines just described.

In FIG. 6, corresponding parts have been given the same reference characters as in FIG. 3. It will be noted at once that there have been added tapped potentiometers 71 and 72 each energized through their respective rheostats 73 and 74. The potentiometer 71 is connected in series circuit relation with the input to the function generator 18A for the purpose of modifying its input signal. Thus with the parts in the position shown, there is introduced into its input circuit the voltage appearing between conductors 75 and 76, this being the voltage derived by way of contact 86 from the $G_2$-tap of potentiometer 71. This voltage appearing between the conductors 75 and 76 is subtracted from the voltage appearing between conductors 36 and 37. Accordingly, by subtracting base generation from total area generation, there is obtained a voltage between conductors 37 and 76 representative of the quantity "area regulation" (area regulation is discussed in detail in my Patent 2,773,994). The result of the foregoing will now be summarized.

If the required area generation has the value of $G_2$, i.e., at the basepoint corresponding with the point $B_2$ of FIG. 7, then the voltage between conductors 75 and 76 will exactly equal the voltage between conductors 36 and 37. Since there is still desired an output representative of the voltage for the value of $\lambda_2$, there is utilized the second potentiometer 72 having a contact 87. Accordingly the voltage between conductors 77 and 78 is adjusted to be representative of the value of $\lambda_2$. If it is assumed that an area requirement now appears indicating a need to increase area generation, then the slidewire contact 41 will be moved from its illustrated midposition to the right to increase the voltage introduced into the series input circuit of the function generator or potentiometer 18A. This will cause the output at terminals 79 and 80 to rise by the amount represented by the straight line segment between breakpoints $B_2$ and $B_3$ of FIG. 7. It is to be emphasized that the area requirement also is effective to adjust the contact 81 of the slidewire 82 associated with a control arrangement 83 of any selected type but in this instance preferably of the kind disclosed and described in Davis et al. Patent 2,830,245. The control system 83 introduces the modifying adjustment of potentiometer contact 28 to assure operation on the true lambda curve 48 and may include any combination of proportional, rate and reset actions. The correction required as will be clear from an inspection of the difference between the straight line segment between breakpoints $B_2$ and $B_3$ and the curved part of the graph 19 between these same points will in general be less than when a single-segment curve is used as in FIG. 5.

In the event that the total area generation rises above the breakpoint $B_3$ or the value $G_3$, it will be seen that the operating cam 84 moves its operating surfaces relative to the follow up element 85 to operate the contacts 86 and 87 associated with the tapped potentiometers 71 and 72. Thus, with the assumption just made, the rotation of operating cam 84 will be in a clockwise direction to move the contacts 86 and 87 into electrical connection with the taps $G_3$ and $\lambda_3$. As total system generation changes to the maximum value of $G_4$ or as it decreases to lesser values, the rotation of cam 84 will be in a corresponding direction to make the indicated connection to the illustrated corresponding labeled taps on the potentiometers 71 and 72.

From the foregoing it will be understood that the potentiometers 71 and 72 may have many more taps than illustrated and the multilevel cam 84 may have correspondingly more operating regions for the contacts 86 and 87 to operate to intermediate positions relative to the potentiometers.

Figure 8:
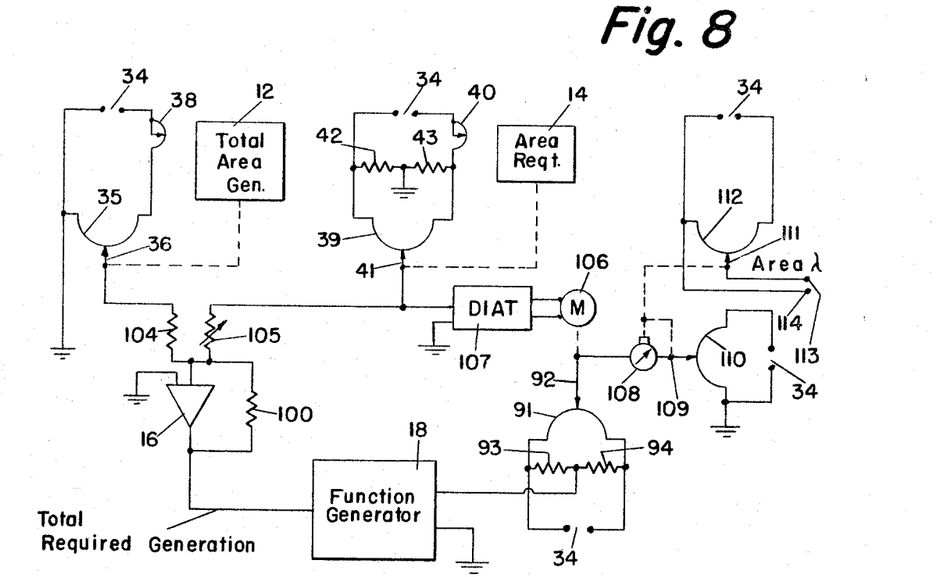
FIG. 8 illustrates a still further modification of the invention.

Referring now to FIG. 8, the operation is generally similar to that of the systems of FIGS. 3 and 6 which have just been described including the introduction of the correct voltage into the output of the function generator 18. It will be seen that the potentiometer 35 has its output adjused in response to total area generation. The area requirement potentiometer 39 is adjusted by signals from the area requirement computer box 14, this output being shown as a mechanical one as in the previous figures. The output voltage from potentiometer 35 is applied through a summing resistor 104 to a summing amplifier 16 having a feedback resistor 100. The output voltage from the area requirement slidewire 39 is applied to the summing amplifier 16 by way of a variable resistor 105. With the value of resistor 105 equal to that of resistor 104, the amplifier 16 provides an output which is the sum of total area generation and area requirement and thus is representative of total required generation of area A. Instead of adjusting the rheostat 40 to change the relative magnitudes of the voltages from potentiometers 35 and 39, the summing resistor 105 may be varied relative to resistor 104 to change the relative effectiveness of the area requirement and total generation signals. Normally the adjustment of resistor 105 will be from a value equal to resistor 104 to a smaller value to increase the effect of the voltage applied to the summing amplifier 16 from the area requirement potentiometer 39. It is in this way that the area requirement effect may be enhanced and made greater than it otherwise would be to provide area-assist control action.

The output of the summing amplifier 16 is applied directly to the function generator 18 which, like the system of FIG. 2, may take the form of a function generator described in the Davis Patent 3,059,853, it being understood of course that this function generator 18 provides an output representative, to a close approximation, of the area lambda for an applied signal representative of the total required generation. The output from the function generator 18 is modified by a series-connected potentiometer 91, the movable contact 92 of which is adjusted by a motor 106 operable under the control of a control system of the Duration Impulse Adjusting Type. Such a control system is disclosed in Jenkins et al. Patent 3,008,072. The motor 13 of that patent will correspond with the motor 106 and the input to the control system 107 will correspond with the input $E_1$ of the Jenkins et al. patent applied between conductors 30 and 31 thereof.

The control system 107 has considerable flexibility in that there may be utilized any combination of proportional action, rate action and reset action. In this connection it may be mentioned that the pulse generator 32 of FIG. 3 in response to adjustment of contact 49 by the area requirement block 14 introduces reset action. Thus the electrical system of block 107 of FIG. 8 may be made to operate in the same manner as the arrangement of FIG. 3, i.e., with reset action only. The modification of the output of the function generator 18 of FIG. 8 will be generally the same as the operation due to the adjustment of contact 92 of the FIG. 3 modification. When so operating, the modified output is applied to an electronic unbalance sensing detector or instrument 108 which rebalances the circuit by adjustment of a contact 109 of a potentiometer slidewire 110 energized from a suitable source 34. The detector 108 also adjusts a contact 111 of a potentiometer 112 also energized from a suitable source of supply 34. Thus the output from the potentiometer 112 as appearing between output terminals 113 and 114 will be representative of area lambda.

With the control 107 adjusted to include a proportional control action from area requirement in the adjustment of slide-wire contact 92, it will be understood that this proportional control action will provide an area-assist control action for the reason that during the existence of an area requirement, the contact 92 will be displaced from its lambda-modifying position by an amount proportional to the area requirement. This displacement will produce a deviation in the output voltage between terminals 113 and 114 from a voltage representative of area $\lambda$ to provide source generation changes directly related to area requirement to restore the area more rapidly to its scheduled operating condition.

Figure 9:
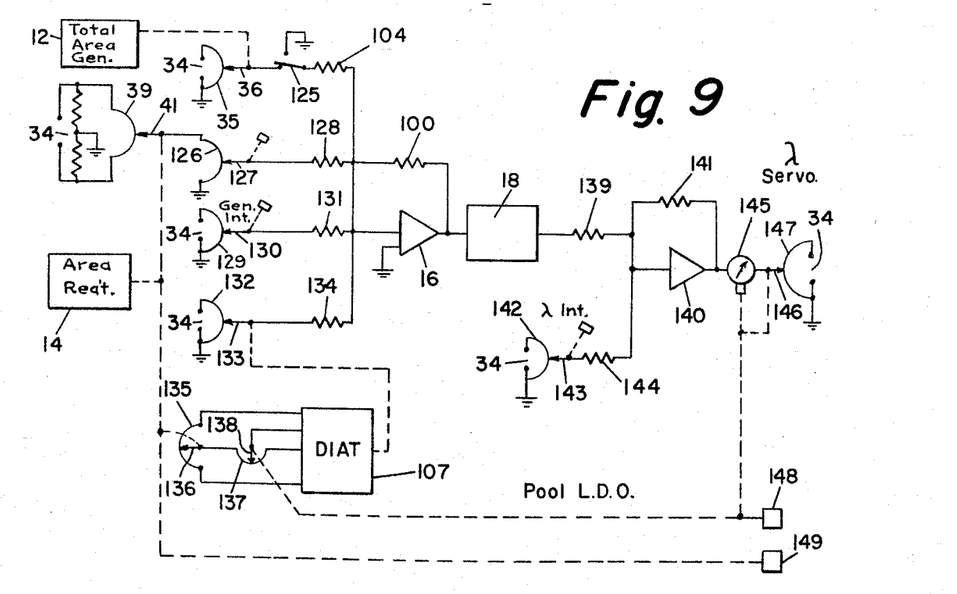
FIGS. 9, 10 and 11 diagrammatically illustrate a further modification of the invention.
Figure 10:
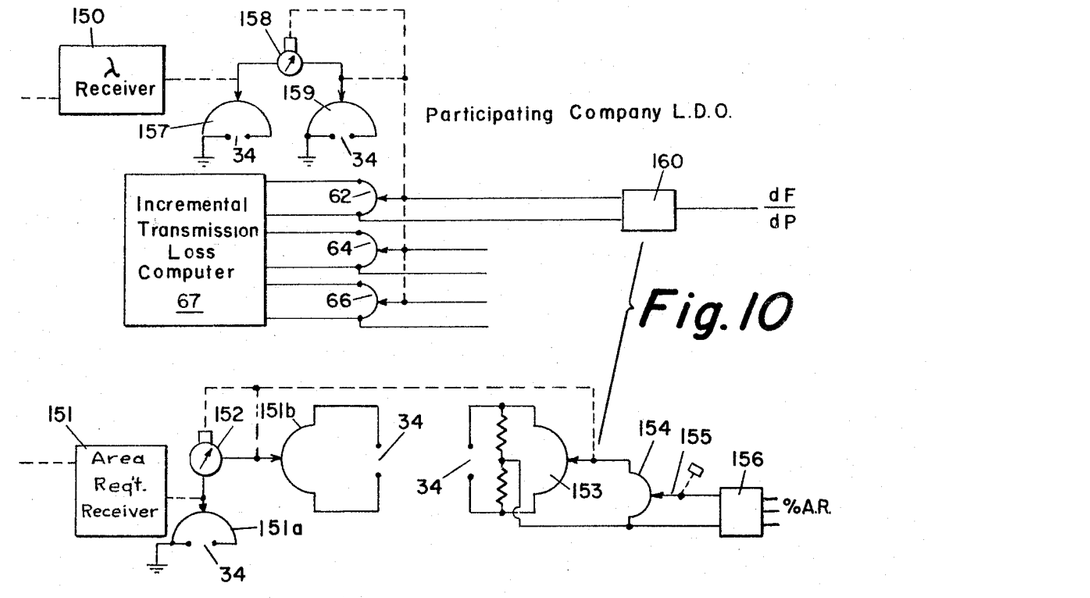
Figure 11:
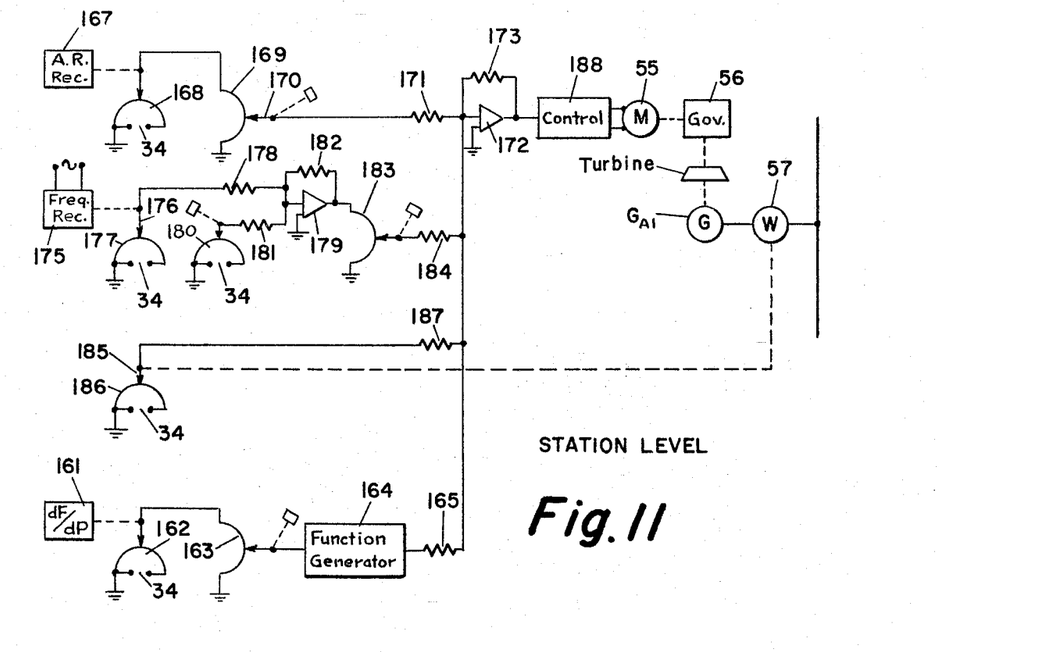

Referring now to FIGS. 9–11, there has been illustrated a modification of the invention which among other things introduces an area-assist control action at station level by means of a communication and control channel which is independent of the channel which carries the economic signals. In this way, area-assist action is obtained without distortion of the area lambda signal which is transmitted to various points in the area. Also it should be noted that FIGS. 9–11 taken together are indicative of control arrangements applicable to a power pool having a number of participating and interconnected operating companies each with their own dispatching offices, and each with their own regulating sources. FIG. 9 represents equipment that may be installed at the Pool Headquarters Load-Dispatching Office. FIG. 10 illustrates apparatus at a participating company load-dispatching office while FIG. 11 shows equipment for a source at a station of one of the participating companies. As indicated in FIGS. 9–11, suitable telemetering channels link control apparatus at the pool office to control apparatus at each of the participating company dispatching offices, and suitable telemetering channels link control equipment at a participating company's dispatching office to control equipment at its respective stations.

More particularly, in FIG. 9, the total area generation from the measuring arrangement 12, as in FIG. 8, adjusts the position of the contact 36 of potentiometer 35 to apply through a switch 125 and summing resistor 104 a voltage representative of total area generation to the input of the summing amplifier 16. The arrangement 14, responsive to area requirement, adjusts a contact 41 of potentiometer 39 to apply through a proportional band slidewire 126 and summing resistor 128 to the input of summing amplifier 16 a voltage proportional to area requirement. By adjustment of contact 127, the proportion of the voltage representative of area requirement may be adjusted in magnitude as required. The potentiometer 129 having an adjustable contact 130 applies a voltage by way of a summing resistor 131 to the input of amplifier 16. This voltage may be designated the generation-intercept voltage in that its purpose is to establish the beginning of curve 48 at the point $G_1$.

A potentiometer 132 having an adjustable contact 133 applies through a summing resistor 134 a voltage to the input of amplifier 16 dependent upon the position of contact 133 as established by the reset system 107. This "DIAT" system, as explained above, is fully disclosed in said Jenkins et al. Patent 3,008,072 and includes in FIG. 9 a slidewire or adjustable resistor 135 with an adjustable contact 136, together with a sensitivity-adjusting slidewire 137 with an adjustable contact 138. These slidewires correspond respectively with slidewires 22 and 26 of FIG. 1 of said Jenkins et al. patent, the motor 13 of that patent being included in the block 107 and with the mechanical connection therefrom extending to and operating the movable contact 133 of slidewire 132.

Remembering the description of the system of FIG. 8, it will be seen at once that the amplifier 16 has applied to it voltages proportional to area requirement and total area generation. These voltages as modified by the generation-intercept voltage and a voltage from potentiometer 132 are algebraically added together by the summing amplifier 16 and applied to the function generator 18. The output voltage is applied by a summing resistor 139 to the input of a summing amplifier 140 having a feedback resistor 141. By means of a potentiometer 142 having an adjustable contact 143, there is applied through a summing resistor 144 a lambda-intercept voltage which, as shown in FIG. 7, will correspond with the value of $\lambda_1$. This voltage plus the voltage from potentiometer 129 fixes the beginning of curve 48 at base point $B_1$.

At the output of summing amplifier 140 there will be developed a voltage which initially approximates the value of lambda as generation varies from the value of $G_1$ upwardly, as shown in FIG. 7. The output of amplifier 140 is applied to a detector 145 which adjusts contact 146 of a potentiometer 147 for introducing a voltage in the circuit to balance the output of amplifier 140.

In contrast with the system of FIG. 8 in which a voltage was added to the output of the function generator 18 in order to establish a more accurate value of system lambda, the arrangement of FIG. 9 utilizes the response from the area requirement box 14 for the adjustment of the contact 136 of slidewire 135. This, in turn, produces an adjustment of contact 133 of potentiometer 132 to modify the input to the summing amplifier 16. Thus as long as area requirement is not zero, there will be an adjustment of contact 136 to produce an output and a continuous change in the position of contact 133. Thus this change in the input to summing amplifier 16 is continuously made until area requirement is reduced to zero. The area lambda is then precisely computed. In this connection, the contact 138 is adjusted by the detector 145 to modify the sensitivity of response of the DIAT control 107, i.e., to regulate the rate of change of the output for a given input in accordance with the magnitude of the output from summing amplifier 140.

The output from amplifier 140 as determined by detector 145 is applied to a telemetering transmitter 148. The area requirement output from arrangement 14 is applied to a second telemetering transmitter 149. These transmitters have their necessary counterpart at the participating company's load-dispatcher's office. Thus the lambda output from detector 145 is by transmitter 148 applied to a lambda receiver 150, FIG. 10, and the output from the transmitter 149 is applied to the area requirement receiver 151.

The detector 152, associated with a retransmitting slidewire 151a and a rebalancing potentiometer 151b, serves to adjust the contact of a retransmitting arrangement 153 which includes an output slidewire 154 having an adjustable contact 155 to predetermine the fraction of the area requirement signal to be applied to a telemetering transmitter 156. This area requirement signal, after determination by the load dispatcher's office as to the fraction thereof to be sent to station level, is transmitted to that station. As shown three outputs can be made available from transmitter 156, one for each station. Where different fractions of the area requirement signal are to be sent to the respective stations the retransmitting arrangement 153–156 will be duplicated, one for each station.

The lambda receiver 150 adjusts the contact of a potentiometer 157. A detector 158 adjusts the contact of a retransmitting slidewire 159, which detector is utilized, as in FIG. 3, to adjust the contacts of slidewires 62, 64 and 66 associated with the incremental transmission loss computer 67 to provide outputs for each of the several stations proportional to the incremental cost of generation of each generating station. Thus the output from slidewire 62 is applied to a telemetering transmitter 160. At station level, the signals from transmitter 160 are applied to a telemtric receiver 161, FIG. 11, for adjustment of the contact of a potentiometer 162 to apply to a performance-slidewire 163 a voltage representative of incremental cost of generation $dF/dP$. This performance-slidewire 163 adjusts the output applied to function generator 164 to take into account not only fuel costs, but also other variables, such as deviation of the unit from maximum operating efficiency. Thus, the voltage applied to the function generator 164 is proportional to incremental heat rate. This function generator will be of the type disclosed in said Davis Patent 3,059,853, the principal difference being that in FIG. 11 the slidewire 163 has combined the functions of slidewires 14 and 15 of said Davis patent.

As more fully explained in said Davis patent, the output of said function generator 164 will be proportional to the desired generation of the generator $G_{A1}$. At the station level this desired generation value, as determined by the function generator 164, is further modified. First, it is modified by that proportion of the area requirement signal sent to the station level by the transmitter 156, FIG. 10, to the area requirement receiver 167. Further flexibility is provided by potentiometer 168 which applies to a slidewire 169 a voltage representative of the area requirement signal. A selected fraction of this voltage may, by operation of the adjusting knob, be applied to a summing resistor 171 of a summing amplifier 172 having a feedback resistor 173.

In accordance with the disclosure in my Patent 2,866,102, it is desirable at station level to introduce a unit frequency bias. Thus the value of desired generation for generator $G_{A1}$ may be modified to permit normal governor responses to change in frequency due to remote load changes or to assigning desired frequency response for the unit to frequency changes. This is readily accomplished by utilizing a frequency responsive meter 75 to adjust a contact 176 of a potentiometer 177 in proportion to change in system frequency. The ouput from this potentiometer is applied by a summing resistor 178 to a summing amplifier 179. Desired system frequency is set by a potentiometer 180, which, of course, will normally be a voltage representative of 60 cycles per second. This voltage is applied through a summing resistor 181 to the input of amplifier 179 which also has a negative feedback resistor 182. By means of a slidewire 183, a selected proportion of the output signal from amplifier 179 will introduce through summing resistor 184 the selected unit frequency bias to be utilized.

By means of a power responsive device of wattmeter 57, a contact 185 of a potentiometer 186 may be adjusted. The output of this potentiometer applied through summing resistor 187 is algebraically added to the remaining input voltages. When the output of generation of unit $G_{A1}$ is equal to the desired generation as modified in manner just described, the input to the amplifier 172 will have been reduced to zero. When there is a net to amplifier 172, the output signal is applied to a conventional control system 188 for energization of the governor motor 55 for adjustment of the governor 56 which then changes the output of the prime mover (not shown) driving the generator $G_{A1}$ and in direction to change the operation of the wattmeter 57 to bring to zero the input to the summing amplifier 172.

Returning again to FIG. 9, it will be observed that the switch 125 may be operated to connect resistor 104 to ground, i.e., to apply zero signal to the corresponding input of the summing amplifier, that is, by way of resistor 104. For this alternative operation, the value of total area generation will not be applied to the summing amplifier. However, the reset arrangement of 107 now operates additionally to replace the feedback previously obtained from the total area generation signal of block 12, and continues in effect to adjust contact 133 of potentiometer 132 to achieve a full integration of area requirement. The integral of area requirement, when area requirement has been reduced to zero, has an equivalence with total area generation. Advantage is taken of the foregoing fact in using the system of FIG. 9 when the total area generation signal may not be available. The function generator 18 functions as before and, due to the other component elements of the system, provides the approximate lambda value, and eventually the precise lambda value, needed for most economic loading of the generating units. The direct feedback from the total area generation signal is the preferred arrangement, for it will be more prompt than would be the signal obtained by total integration of area requirement.

Though in all of the several figures the sources of supply have been identified by a common reference character 34, it is to be understood in practice that these sources may be separate batteries or other isolated power sources such as separate windings of a power transformer. By utilizing separate secondary windings isolation between the several parts of the circuit will be readily provided.

It is to be understood that the several modifications of the invention have been presented to illustrate typical examples of how the advantages of the invention may be realized, FIG. 8 being one of the preferred forms. It is to be understood however that these several systems are to be taken as illustrative only. Thus for example instead of providing the potentiometer 91 and associated motor 106 the control system of block 107 may include an output which will itself be voltage and can be directly introduced in place of potentiometer 91 in the output circuit. Various other changes will thus likewise suggest themselves to those skilled in the art and these various modifications are intended to be included within the scope of the appended claims.

What is claimed is:

1. In a system for determining the incremental cost of generation for each generation source of a group connected to a common distribution system and required to maintain a group schedule with most economic operation of said group, the combination of
    means for producing total group generation signals representative of the total generation required of said group to maintain said group schedule,
    means responsive to said total generation signals for producing output signals varying approximately as the incremental cost required of said group for most economic operation of said group, and
    means for generating area requirement signals, and
    means responsive to said area requirement signals for varying said output signals representative of said incremental cost for establishment of a more exact economic operation of said group at levels representative of said total required generation.

2. The combination of claim 1 in which means are provided so that the generation of said group is modified in response to said modified signals representative of said changed incremental cost required of said group.

3. The system of claim 1 in which the last-named means thereof includes elements which produce said variation in said output signals by an amount proportional to, and additionally at a rate dependent upon, the magnitude of said area requirement signals.

4. In a system for determining and controlling the incremental cost of generation for each generation source of a group connected with a common distribution network and required to maintain a group schedule with most economic operation of said group, the combination of means responsive to total area generation for producing first output signals, means responsive to area requirement of said network for producing second output signals, means for algebraically adding said first and second output signals for producing an output whose magnitude varies with total required generation, a function generator interrelating total generation and an approximate lambda, lambda being defined as the incremental cost, means for applying said output representative of total required generation to said function generator for developing lambda-output signals, means responsive to said second output signals for modifying said lambda-output signals for producing a more exact area lambda, and means responsive to said more exact area lambda for varying the generation of said group for most economic operation of said group and to meet said group schedule.

5. The combination of claim 4 in which said first output signals and said second output signals are in the form of voltages and in which said voltages are algebraically added together to produce a voltage output representative of said total required generation and in which said function generator is a voltage-modifying arrangement.

6. The combination of claim 4 in which there is included an incremental transmission loss computer for introducing transmission-loss corrections for operation of said group at a minimum incremental cost of delivered power therefrom.

7. The method of determining the incremental cost for each generation source of a group connected to a common distribution system and required to maintain a group schedule with most economic operation of the group, which comprises generating signals representative of total-group-generation of said sources, developing at least in part from said total-group-generation signals output signals representative of system lambda to an approximation thereof, where system-lambda is defined as the incremental cost for most economic operation of said group of generation sources, generating area-requirement signals representative of the amount by which the generation of said common distribution system must be changed to correct its deviation from said group schedule, and modifying said output signals in accordance with said area-requirement signals independently of said total-group-generation signals for producing modified system-lambda signals of magnitude representative of system-lambda to a closer approximation than theretofore made.

8. The method of claim 7 in which said system-lambda representing said incremental cost is utilized for regulating the generation of said sources by the additional steps of transforming said system-lambda signals to source generation signals, and changing the generation of said sources in response to said source generation signals to meet said group schedule and to operate at said system-lambda.

9. In a system for controlling the generation of a group of sources connected to a common distribution network and required to maintain a group schedule with most economic operation of said group, the combination of a function generator interrelating two effects, one representative of generation of said group and the second representative of a corresponding incremental cost of said group, means for producing and applying to said function generator an input proportional to total group generation, means for producing and applying to said function generator an input which changes by an amount proportional to, and additionally at a rate dependent upon, the change in generation required to maintain said schedule for producing from said function generator an output, means responsive to said output for controlling the generation of said group, and means operatively associated with said function generator for changing said output representative of said incremental cost of said group until said generation of said sources meets said schedule.

10. The system of claim 9 in which means are provided responsive to the output of said function generator for varying the rate of change of said input to said function generator for a given change in generation required to maintain said schedule.

11. The system of claim 9 in which there are provided means located at said sources responsive to changes in generation required to maintain said schedule for modifying said generation of said sources by an amount proportional to said last-named changes to provide area-assist action.

12. In a system for controlling the generation of a group of sources connected to a common distribution network and required to maintain a group schedule with most economic operation of said group, the combination of a function generator interrelating two effects, one representative of generation of said group and the second representative of a corresponding incremental cost of said group, means for producing and applying to said function generator a plurality of inputs for producing an output, a first of which inputs has a magnitude proportional to total-group-generation, a second having a magnitude proportional to the change in generation required to maintain said schedule, and a third which varies in magnitude at a rate dependent upon the change in generation required to maintain said schedule, an incremental transmission loss computer for introducing transmission-loss corrections to said output and for developing therefrom outputs representative of the incremental cost of generation for said sources, means including a function generator for each of said sources for developing generation-changing signals from said incremental cost of generation outputs, and means responsive to said last-named signals for changing the generation of said sources by amounts proportional to the magnitude of said generation-changing signals.

13. The system of claim 12 in which there are provided means for modifying said generation-changing signals directly in accordance with the magnitude of the required change in group generation needed to maintain said group schedule.

14. The system of claim 13 in which means are provided further to modify said generation-changing signals by amounts proportional to deviations of the frequency of said network from a predetermined value.

15. In a system for controlling the generation of a group of sources connected to a common distribution system and required to maintain a group schedule with most economic operation of said group, the combination of a function generator establishing a predetermined relationship between two effects, a first of said effects representing total generation of said group, and the second effect representing a corresponding approximate incremental cost for said group, for producing an output from said function generator representative of said second effect upon application as an input to said function generator said first effect, means responsive to the total generation required of said group to maintain said group schedule for producing said first effect and for applying said first effect to said function generator, as the input thereof thereby to produce said second effect, and modifying means responsive to the required change in group generation to maintain said schedule for modifying said second effect to establish a more exact incremental cost for most economic operation of said group.

16. In a system for determining the incremental cost of generation for each generation source of a group connected to a common distribution system and required to maintain a group schedule with most economic operation of said group, the combination of a function generator interrelating total generation and an approximate lambda, lambda being defined as said incremental cost, means for generating area requirement signals of magnitude representing the required change in generation of said group to maintain its group schedule, integrating means responsive to the required change of generation of said group for generating integrated signals, means for combining said area requirement signals and said integrated signals to produce required generation signals representative of the total generation required of said group to maintain said group schedule, means for applying said required generation signals as an input to said function generator for producing as an output lambda-output signals, and means responsive to said lambda-output signals for modifying the action of said integrating means for regulating the rate of change of said integrated signals for a given magnitude of said area requirement.

17. The system of claim 16 in which means are provided to introduce into said input to said function generator a component representative of existing total group generation.

References Cited by the Examiner
UNITED STATES PATENTS

| | | | |
|---|---|---|---|
| 2,824,240 | 2/1958 | Lynch | 307—57 |
| 2,839,692 | 6/1958 | Kirchmayer | 307—57 |
| 2,962,598 | 11/1960 | Larew | 290—4 |
| 3,117,221 | 1/1964 | Kirchmayer | 235—185 |
| 3,124,699 | 3/1964 | Kirchmayer | 307—57 |

ORIS L. RADER, *Primary Examiner.*

LLOYD McCOLLUM, MILTON O. HIRSHFIELD, *Examiners.*

L. CASSETT, T. J. MADDEN, *Assistant Examiners.*